Figure 1:
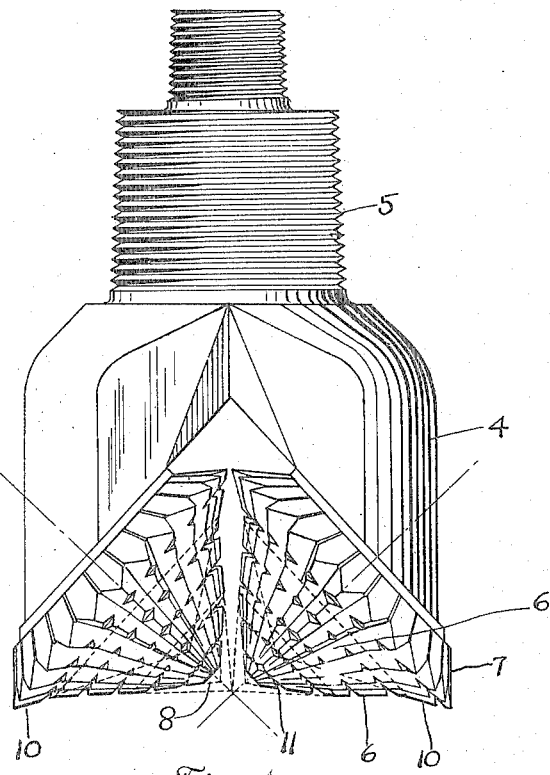

H. R. HUGHES.
ROTARY BORING DRILL.
APPLICATION FILED FEB. 13, 1919.

1,325,944. Patented Dec. 23, 1919.

Howard R. Hughes, Inventor
By his Attorney Jesse R. Stone

UNITED STATES PATENT OFFICE.

HOWARD R. HUGHES, OF HOUSTON, TEXAS.

ROTARY BORING-DRILL.

1,325,944.  Specification of Letters Patent.  Patented Dec. 23, 1919.

Application filed February 13, 1919. Serial No. 276,841.

*To all whom it may concern:*

Be it known that I, HOWARD R. HUGHES, a citizen of the United States, residing at Houston, Texas, county of Harris, have invented a certain new and useful Improvement in Rotary Boring-Drills, of which the following is a full, clear, and exact description, such as will enable others skilled in the art to which it appertains to make and use the same.

My invention relates to roller cutters for rotary boring drills for use in well drilling and has particular application to roller cutters of the cone type used in drilling rock or other hard formation.

The invention is designed particularly as an improvement on the type of cutters shown in the drawings of my prior Patent No. 930,759, issued August 10, 1909.

The main object of my invention is to provide a cutting surface for the cutter, which shall be of such shape as to produce a more effective action in disintegrating material at the bottom of the well being drilled.

I also desire to so form the cutter as to obtain the greatest cutting action at the point where such cutting action is necessary.

Figure 2:
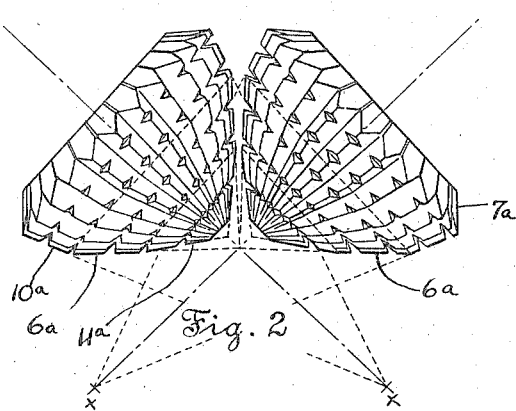

Referring to the drawings forming a part of this specification and in which like numerals are applied to like parts as far as possible throughout the several views, Figure 1 is a side elevation of a bit showing one embodiment of my invention; Fig. 2 is a side elevation of two cutters showing a different embodiment of my said invention.

It is customary in the use of rock bits, with conical-shaped cutters mounted in the base thereof, to arrange the cutting surfaces of the cones in such manner that the said surfaces will have a true rolling motion on the bottom of the well as the drill head is rotated. In order to obtain this true rolling motion it will be obvious that the cutting surfaces in contact with the bottom of the hole must be arranged in such manner that the conical cutting surface, if produced, would come to an apex at the central axis of rotation of the head. In such cutters the part of the cutting surface nearest the axis of rotation of the bit cuts the smallest area, due to the fact that it rotates in a smaller circle. Teeth on the cutters are usually radial from the apex of the cone. Thus there are customarily as many teeth at the small end of the cone as there are at the larger diameter. The outer portion of the teeth, although larger, usually dull quicker and, as they cut a larger area than the small teeth at the center of the hole, they retard the forward cutting action of the bit. In my Patent No. 930,759 previously referred to are illustrated the cutting cones now used. Such cones have approximately conical shape, there being one main cutting zone the surface of which, if continued to an apex, would lie in the axis of rotation of the head. The apex of the cutter is, however, truncated, as shown in the patent, this truncated surface being usually provided with cutting teeth to disintegrate the core which lies at the center of the hole. Outside of the main cutting zone the cone is inclined in the opposite direction, making a cutting zone which will be vertically arranged so as to cut the side of the hole being drilled.

When these cutters are mounted on the drill head and the drill head rotated, the cutters will roll on their axes upon the bottom of the hole. The axes of the cutters are slightly offset relative to each other, thereby spacing the cutters slightly at the central axis so that they will not touch.

In the embodiment illustrated in the Patent 930,759, previously referred to, it will be clear that the principal cutting zone will roll on the bottom of the hole and that there will be no slipping of any portion of the cutting surface. There may, however, be a very slight slipping on the surface at the side of the hole, as the teeth thereon move into the vertical position, but it will be obvious that these latter toothed surfaces will not, under ordinary circumstances, be called upon to perform any material cutting action. These cutters are old in the art and are usually provided with cutting teeth upon these outer surfaces in such a manner that when they roll upon the bottom of the hole the teeth will dig into the material, thus having a chisel action and serve to disintegrate the material. It is found, however, that if they do not have a true rolling action at all points, there will be a slight slipping or scraping of certain parts of the cutting surfaces, which will thereby serve to more rapidly disintegrate the material being drilled.

In the drawing I have shown a rock bit having a head 4 with an upper shank 5 threaded for attachment to the drill stem, not shown. Mounted on the lower end thereof are two conical cutters similar to those shown in my previous patent and having surfaces so arranged that there will be a central surface 6 which is adapted to roll upon the bottom of the hole with a true rolling motion. This rolling is accomplished by so inclining the toothed surface along the central zone and so mounting the cutter that the said surface, if produced toward the axis of rotation of the bit would come to an apex on the said axis. On each side of the central zone 6 having the true rolling motion, are surfaces inclined in different directions from that of the surface 6. On the inner end of the cone the cutting surface 11 is inclined upwardly from that of the true rolling surface so as to come to an apex at a point short of the axis of rotation of the bit. This surface will, therefore, not have a true rolling motion but will in fact tend to have a slipping or scraping action on that portion of the bottom of the hole and will tend somewhat to lag behind, in this scraping action, the true rolling motion of the central zone.

Outside of the central zone 6 is the cutting zone 10 which is inclined downwardly from the true rolling surface, so as to increase the diameter of the cone unduly on that surface, thus tending to cause a slipping or scraping action of the said surface 10. This slipping will be in a direction opposite from that of the surface 11, that is, this zone will tend to roll somewhat faster on the bottom of the hole than the central surface 6, due to the fact that it is of larger diameter than it would be if it had a true rolling surface and must roll faster to cover the larger area due to the increased diameter. It will thus be noted that each cutter has three cutting surfaces tending to act upon the bottom of the hole and to drill or cut away the material with which the cutters contact.

The outer larger end of each of the cutting cones is tapered in a direction opposite from that of the cutting surface, as shown at 7. Said surface 7, because of the position in which the cutter is mounted, is parallel to the sides of the hole being drilled, and tends to smooth and equalize the walls of the hole. As the two surfaces 10 and 11 tend to counteract each other in their rolling action they may be so arranged as not to interfere with the true rolling motion of the surface 6 upon the bottom of the hole. The friction produced by the cutting area 6 would, if acted upon by no other influence, tend to have a true rolling motion due to the inclination thereof. The surface 11 will cause a slight drag on that part of the hole and the action of the surface 10 will be such as to tend to increase the speed of the cutters and cause the surface 6 to roll faster than the true rolling motion which it would otherwise have. But if the surfaces 10 and 11 are of the proper width compared to each other and to the surface 6, there will be a true rolling motion on the central zone and a slipping action on the two zones contiguous thereto, thus causing greater wear on the bottom of the hole on those areas than at the central zone 6. The result of this slipping action is that the parts of the hole which are usually the hardest to drill are acted upon by the areas of the cutting cones which have a more active cutting action and thus tend to advance the bit equally on all the surfaces.

In Fig. 2 there is a cutting zone $6^a$ which if produced would come to an apex on the axis of rotation and hence have a true rolling motion. On the inner end of the cone the surface $11^a$ comes to an apex short of the axis of rotation of the bit in the same manner as the surface 11 of the first embodiment. The surface $10^a$ outside the cutting zone $6^a$, however, is tapered upwardly from the line of the surface $6^a$ so as to reduce the diameter of the cone relatively at that point. The surface $10^a$, if produced, therefore, would come to an apex at a point some distance beyond the axis of rotation of the bit. The surface $10^a$ then would tend to lag behind the true rolling action of the zone $6^a$. It is possible, as will be obvious, to so proportion the area of the surfaces $10^a$ and $11^a$ relative to that of the true rolling surface $6^a$ as to cause the cutter to rotate somewhat more slowly than it would if it had a true rolling motion, thus causing a slipping action on the surface $6^a$, and it may be that in some formations a slipping action on the central zone will be desirable, and in such case the relative area of this central zone, as compared to the cutting surfaces on each side thereof, will be less than the combined areas of the adjacent zones. This will cause a slipping action on the zone $6^a$, and therefore a more rapid cutting and disintegrating effect. It is usually desirable, however, to obtain a balanced action of the cutters such that the slipping or scraping effect of the cutting surface $10^a$ will be somewhat greater than that of the rolling surface $6^a$, thus producing a cutter adapted to cut all portions of the bottom of the hole at about the same speed. No exact ratio of the size of the cutting zones can be fixed except by experiment in the different grades of strata in which the drill is operating. It is contemplated that there will be a central zone, adapted to have a true rolling motion with zones on each side thereof, which shall be so inclined relative to the cutting zones that the proper balanced cutting action on the bottom of the hole will be effected. A cutter approximately as shown in Fig. 1 has been found to produce an equal cutting effect on all parts of the hole in rock of ordinary hardness. I do not, however, wish to confine my invention to any particular form or inclination of the cutting areas, except as is included within the appended claims.

Having thus described my invention, the objects and advantages will be clear without further description. What I claim as new and desire to protect by Letter Patent is:

1. A cutter for roller drill bits comprising an approximately frusto-conical shaped roller whose cutting surface comprises a forward cutting area adapted to cut the bottom of the hole and a lateral area adapted to cut the side of the hole, said forward surface being composed of a plurality of cutting zones whose inclination relative to the axis of rotation of the drill is such as to obtain a true rolling motion on one zone and a differential slipping and cutting action on the other zones.

2. A cutter for roller drill bits comprising an approximately frusto-conical shaped roller having forward and lateral cutting surfaces, said forward cutting surface being formed in a plurality of zones one of which is so inclined relative to the axis of rotation of the drill as to produce a true rolling motion on the bottom of the hole, and separate zones on each side thereof having a differential slipping action relative to said rolling surface.

In testimony whereof, I hereunto affix my signature this the 10th day of January A. D. 1919.

HOWARD R. HUGHES.